Sept. 7, 1926.　　　　　　　　　　　　　　　　　　　　1,598,897
E. L. TIRRELL
AUTOMOBILE DERRICK
Filed March 15, 1923　　　2 Sheets-Sheet 2
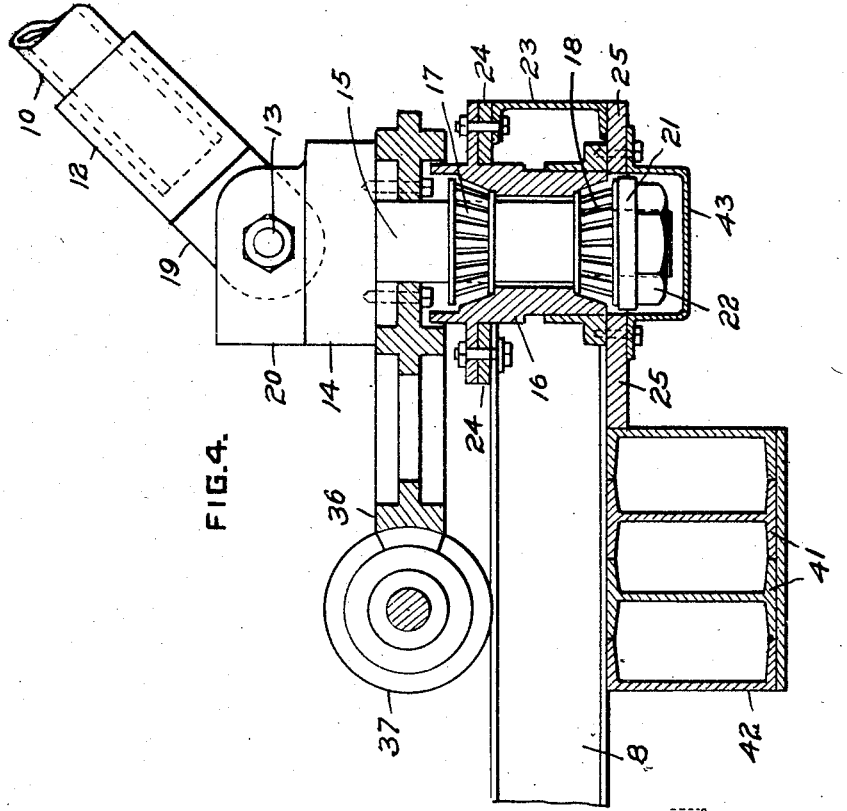
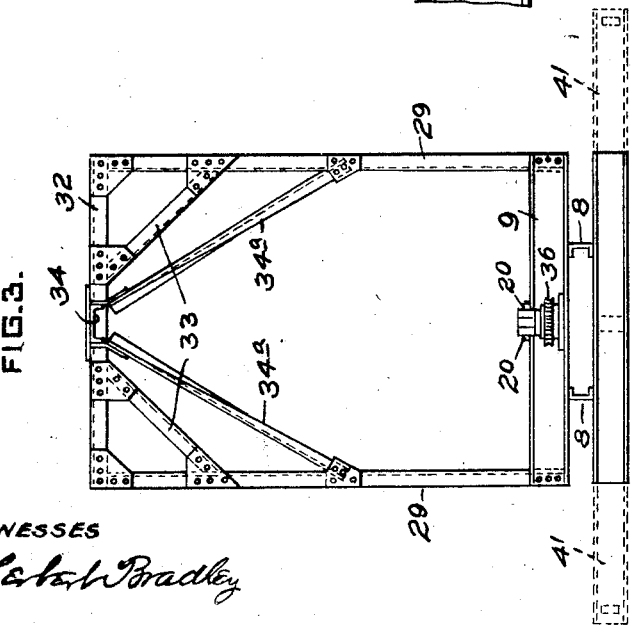
WITNESSES
INVENTOR
Edward Leo Tirrell Patented Sept. 7, 1926.

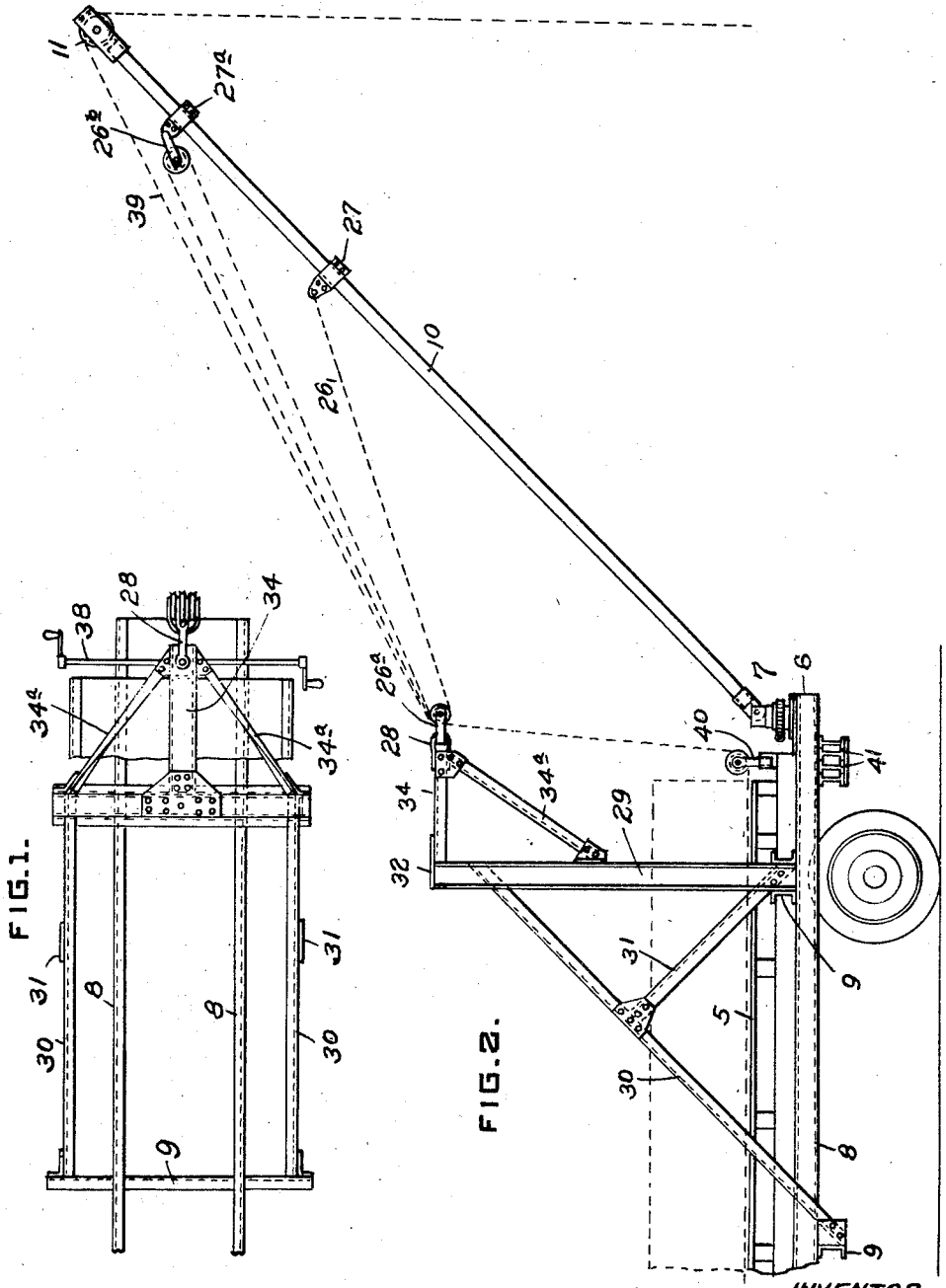

1,598,897

UNITED STATES PATENT OFFICE.

EDWARD LEO TIRRELL, OF PHILLIPSBURG, NEW JERSEY.

AUTOMOBILE DERRICK.

Application filed March 15, 1923. Serial No. 625,256.

This invention relates to automobile derricks and has for an object to produce an improved apparatus of this type which is so constructed and arranged that the vehicle may be effectively employed as a load-carrying vehicle.

A further object is the production of an automobile derrick in which the derrick proper is of simple construction, is easily manipulated and occupies a minimum amount of space, and is so located and arranged as to provide access to the load-carrying platform through the rear of the vehicle.

A further object is to produce an automobile derrick in which the derrick proper may be readily disassembled and loaded onto the truck, forming a part of the structure, so that the truck may be used as an ordinary load-carrying vehicle.

These, and other objects which will be made more apparent throughout the further description of the invention, are attained by means of apparatus embodying the features herein described, and illustrated in the drawings accompanying and forming a part hereof.

In the drawings, Fig. 1 is a fragmental plan view of an automobile derrick embodying my invention; Fig. 2 is a fragmental side elevation of the apparatus shown in Fig. 1; Fig. 3 is an end elevation of the apparatus shown in Figs. 1 and 2, portions being omitted for convenience of illustration; and Fig. 4 is a detail sectional view on an enlarged scale of a portion of the apparatus illustrated in Figs. 1, 2 and 3.

Automobile derricks, as usually constructed, almost wholly incapacitate the vehicle as a load-carrying vehicle. One of the principal objects of the present invention is to provide an apparatus which has all the advantageous features of a portable derrick and which, at the same time may be effectively employed as a load-carrying vehicle, both in connection with loads handled by the derrick, and in connection with lesser loads, not necessitating the use of the derrick.

As illustrated the vehicle is provided with a load-carrying platform 5, mounted on the frame thereof. As shown, the frame is provided with a rear extension 6 on which a derrick 7 is mounted. The extension 6 is not an important feature, and it is usually desirable to install the derrick on the main frame of the vehicle. With either arrangement the frame serves the double purpose of supporting the load-carrying platform 5 and the derrick 7. In the illustrated embodiment, the frame is made up of suitably spaced longitudinally extending beams 8 and cross beams 9, so arranged that intermediate longitudinal beams 8 project rearwardly to form, in effect, the extension 6.

The derrick employed is of special construction so as to provide access to the platform 5, through the rear end of the truck for loading purposes, and so as to obviate the necessity of employing a central mast or a number of guy lines which are ordinarily essential with such derricks.

As illustrated, the boom 10 of the derrick may consist of a heavy steel pipe provided at its outer end with a sheave 11. The inner and lower end of the boom is received by a steel socket member 12 which is pivotally mounted on a horizontally extending pin 13 carried by and secured to a steel shoe 14.

With this arrangement, the boom 10 may be easily and quickly removed from the socket member 12, or the boom and socket member may be removed from the shoe 14. The boom may then be loaded into the truck of the vehicle, or into suitable and convenient brackets provided on one side of the truck, and the truck may then be used as an ordinary load-carrying vehicle.

The shoe 14 is rotatively mounted on the frame of the truck or vehicle, and is preferably provided with an integrally formed bearing-shaft 15, which extends downwardly through a bearing housing 16 and is provided with suitable thrust bearings 17 and 18 for holding it in place in the housing 16.

As illustrated, the socket member 12 is provided at its inner or lower end with an extension 19, through which the pin 13 projects. This extension is held against lateral movement, by ears 20 which are integrally formed with the shoe 14. The bearings 17 and 18 are preferably roller bearings and each is adapted to co-operate with a conical bearing face formed on the housing 16. These bearing faces are oppositely disposed and the bearings 17 and 18 are so arranged with relation to the shaft 15 and the housing 16 that the upper bearing 17 takes downward thrusts imposed on the shoe 14, whereas the lower bearing 18 is capable of resisting upward or dislodging forces which may be imparted to the shoe. The bearing 18 is held in place on the shaft 15, by means of a lock washer 21 and nut 22.

The housing 16 is specifically mounted on the frame of the vehicle so as to resist tilting strains which may be imparted to it. As shown, it is located between the two intermediate beams 8 of the frame, and its length, between the bearings 17 and 18, is substantially equal to the depth of the beam. It is rigidly secured to the supporting beams 8 and to the end girder 23, of the frame, by means of transversely extending plates 24 and 25, which are rigidly secured to the frame and to suitable lugs provided on the housing.

The boom is supported by a single boom-line 26 which extends between the boom and a connection 28, carried by a portal-like superstructure which is rigidly mounted on the vehicle frame spanning the load platform.

As shown the line 26 extends from a bracket 27, rigidly secured to the boom, over a sheave, of a block 26ª then over a sheave of a block 26ᵇ, secured to a boom bracket 27ª, then over a sheave of the block 26ª to a winding drum of usual construction. The drum is not shown, but is preferably located on the frame of the truck under or directly behind the cab of the truck.

As illustrated, the superstructure consists of vertical lateral posts 29, shown as channel irons, which are secured to cross beams 9 forming a part of the frame, and which are reinforced by diagonal struts 30. Each strut 30 is secured to one of the posts 29 at a point near the upper end of the post by means of bolts or rivets and is also secured to one of the cross beams 9 of the frame by means of an angle iron. An intermediate strut 31 extends between each of the struts 30 and its associated posts 29, one end being secured to the lower end of the post and the other to the strut 30, at a point intermediate the ends of the strut. A top cord or cross member 32 extends between and is secured to the upper ends of the posts 29 by means of tie plates. This member is reinforced by diagonals 33 (Fig. 3) which extend between it and the posts 29. The boom line connection 28 is secured to a rearwardly extending member shown as a channel iron 34, which is secured to the top cord 32 at a point midway between its end, and is reinforced by diagonals 34ª, extending between it and the posts 29. (See Figs. 1, 2 and 3.)

The member 34 is of such length that the boom line connection 28 is located vertically above the axis of rotation of the shoe 14. With this arrangement the boom is capable of swinging, unhampered by the superstructure, through an arc of more than 180° and at the same time the superstructure, is so disposed that it is capable of effectively resisting tilting strains which may be imparted to it by normal loading of the boom.

The shoe 14, and consequently the boom, may be turned to different positions by means of a worm and worm wheel, with which the derrick is provided. As shown, a segmental worm wheel 36 is rigidly secured to the shoe 14, and meshes with a worm 37, mounted on the frame of the vehicle. The operating face of the worm wheel is concentric with the axis of rotation of the shoe and the worm is provided with a double-ended operating shaft 38 which extends transversely of the vehicle frame and may be provided with two operating cranks, as shown in Fig. 1.

The inclination of the boom may be varied by varying the effective length of the boom line 26 through the medium of the winding drum windlass. The load-supporting line 39 extends over the sheave 11 and a sheave of the block 26ª. As shown, both the load-supporting line and the boom line extend over sheaves of a block 40 secured to the frame of the vehicle. The load-supporting line 39 extends around the winding drum of usual construction preferably located under or immediately behind the cab of the truck.

In order to prevent tilting of the vehicle frame while the derrick is being employed in shifting a load, jack arms or outriggers 41 are provided on the frame and so arranged that they may be moved to an extended position, as shown in dotted lines in Fig. 3, or to a position such that they do not project beyond the lateral limits of the frame. As shown, each arm 41 consists of an I-beam located within a box-like housing 42, which is built up of channel members and a plate and is rigidly secured to the lower flanges of the beams 8. The channels and the arms 41 are so located, relatively to each other, that the longitudinal movement of each arm is guided by the other arm and one of the channels employed in the makeup of the box-like housing 42. When the arms 41 are extended the frame may be braced against tilting by locating a jack or other braces under the outer end of each extended arm.

In the drawings a grease cup 43 is shown clamped to the plates 25 and enclosing the lower end of the shaft 15 and the nut 22. The vehicle frame may be provided with side boards, tail-gate and top, as is customary.

It will of course, be understood that the winding drums of the load-supporting line and the boom-line may be power actuated if desired, and that the gears may be employed between these drums and the engine of the vehicle, so that the engine may be employed in actuating the derrick while the vehicle is standing still.

The principal advantages of the structure illustrated as an embodiment of my invention is that the arrangement of the derrick proper and the superstructure is such that the derrick has a wide range of operation and at the same time does not obstruct access to the load-carrying platform 5, from either side or the rear of the vehicle.

Another advantage of this structure is that the derrick may be employed for loading and unloading the truck forming a part of the structure. It can also be employed for all purposes for which any derrick is required, and in addition is portable.

A further important advantage of the structure illustrated is that the shoe 14, and consequently the boom 10, is locked in the different positions to which it is turned, by the worm and worm wheel. This is particularly important during the transit and is, of course, important during the operation of handling heavy loads, since it avoids the necessity of employing snub lines.

It will be apparent to those skilled in the art that various changes, modifications, additions, omissions and substitutions may be made in the apparatus illustrated without departing from the spirit and scope of the invention as set forth by the appended claims.

What I claim is:—

1. In an apparatus of the character described, a vehicle frame, a derrick mounted on the frame and comprising a rotatable shoe, a bearing shaft secured thereto, a housing located between the beams of said frame and into which said shaft projects, means for rigidly securing said housing to the frame, thrust bearings between said housing and said shaft, a boom pivotally mounted on said shoe, a super-structure mounted on the frame forward of the derrick, a boom line secured to said structure and said boom and means for operating said derrick.

2. In combination in an apparatus of the character described, a vehicle frame, a derrick mounted on the frame adjacent the rear end thereof and comprising a rotatable shoe, a bearing shaft secured to the shoe, a housing secured to the frame at points adjacent to its upper and lower ends and into which said shaft projects, oppositely disposed thrust bearings located within said housing in spaced relation and acting between said shaft and said housing, a boom pivotally mounted on said shoe, a superstructure mounted on the frame forward of said derrick, a boom-line secured to said structure and said boom, and means for operating said derrick.

In testimony whereof, I have hereunto subscribed my name this 12th day of March, 1923.

EDWARD LEO TIRRELL.